United States Patent [19]
Besnard

[11] 3,761,165
[45] Sept. 25, 1973

[54] PHOTOCHROMIC WINDOW WITH CAPILLARY FLOW CONTROL

[75] Inventor: Jean-Claude Besnard, Gometz-Le-Chatel, France

[73] Assignee: Saint-Gobain Industries, Neuilly sur-seine, France

[22] Filed: Apr. 30, 1971

[21] Appl. No.: 138,940

[30] Foreign Application Priority Data
May 4, 1970 France ............................. 7016181

[52] U.S. Cl. ............... 350/312, 137/98, 350/160 P
[51] Int. Cl. ............................................. G02b 5/24
[58] Field of Search ..................... 350/3, 267, 312, 350/160 P; 137/82, 98; 138/44, 40

[56] References Cited
UNITED STATES PATENTS
3,220,256  11/1965  Weichbrod .................... 138/44 X
3,586,025  6/1971  Blaiklock ............................ 137/82
612,937  10/1898  Vebelacker ....................... 350/312

FOREIGN PATENTS OR APPLICATIONS
1,578,044  7/1969  France ............................. 350/312
602,619  3/1960  Italy ................................. 350/3

*Primary Examiner*—David Schonberg
*Assistant Examiner*—Ronald J. Stern
*Attorney*—Pennie Edmonds, Morton, Taylor and Adams et al.

[57] ABSTRACT

A photochromic window is described in which a photochromic liquid flows slowly between panes of glass, the rate of flow being subjected to capillary control.

11 Claims, 4 Drawing Figures

PATENTED SEP 25 1973  3,761,165

INVENTOR.
JEAN-CLAUDE BESNARD
BY
Bauer and Seymour
ATTORNEYS

PHOTOCHROMIC WINDOW WITH CAPILLARY FLOW CONTROL

This invention relates to windows having multiple panes between which flows a liquid having useful optical properties, the panes being parallel, and transparent or translucent. The invention particularly relates to windows of this type in which the liquid used has photochromic properties, that is to say, for instance, that it may become colored under certain conditions of light.

Such windows have been described in French Pat. No. 1,578,044 of May 8, 1968. They comprise in combination two parallel panes of material able to transmit light and means to flow a liquid which has the desired optical properties between them, the flow being maintained constant and proceeding by gravity so as to assure a continuous renewal of the optically active liquid at a rate related to the rate of degradation thereof. In the prior art such uniformity of flow was not obtained. The means to establish the permanent flow by gravity included two reservoirs, one above the space between the panes and one below it, both being connected to such space throughout its width.

It is an object of this invention to produce regularity of flow of the liquid between the parallel panes of such windows and in particular to maintain the speed of flow of the liquid substantially constant dispite variations in the temperature or the volume of the liquid between the panes, or to adapt the speed of flow to the intensity of solar radiation. In effect, the viscosity of the liquid utilized varies as a function of the temperature. This is particularly the case when the liquid is composed of a solution of polymers which have photochromic properties and in which the viscosity varies strongly with temperature, because if the rate of flow has been calculated to confer the desired properties upon the window at a selected temperature for example 20°C., the speed of flow is much different at higher or lower temperatures, for example at 40°C. or 0°C. In winter the flow will be too slow and a degradation of the liquid will follow, entraining change in the optical properties in the winter. In summer on the contrary where the temperature of the liquid between the panes may reach as high as 60°C. in sunlight the liquid will flow too rapidly and the upper reservoir may be emptied.

Another object of the invention is to overcome these imperfections with simple and effective means to keep the flow of the liquid constant between the panes and to adapt the velocity of flow to the exposure to sunlight.

The objects of the invention are achieved by connecting the upper reservoir, which supplies the flow of liquid, to the space between the panes by one or more capillary tubes, the dimensions of which are chosen to assure a rate of flow which is reasonably constant regardless of the temperature of the liquid between the panes. In effect, the capillary tube and the reservoir are, summer and winter, at the temperature found within the body or chamber which is equipped with the window so that the temperature of the circulating liquid in the capillary tube and the dimensions of the tube remain practically constant at all times. It suffices as a consequence that the resistance to flow of the window is negligible compared to that of the capillary tube, with the result that the flow of liquid remains reasonably constant and does not depend on the exterior temperature nor on the exposure to sunlight.

It is not necessary that the flow of liquid be perfectly constant because in strong sunlight it is preferable that the flow shall be slightly superior to that in cloudy weather in order to compensate for the degradation of the liquid and the alteration of its optical properties. It is clear that the invention solves this problem, permitting an appropriate choice of dimensions of the capillary tube as a function of the space between the parallel panes and the nature of the liquid used, thus producing a ratio of resistances to flow of the capillary tube and of the space between the panes, this varying slightly as a function of the intensity of sunlight. An adequate ratio of these resistances to flow, for a given liquid, can be determined by calculation or by experience so that the speeds of flow of a given liquid for different intensities of sunlight shall be just sufficient to prevent the appearance of degradation in the liquid.

The flow capacity of the tube being far inferior to that of the window it is almost impossible to fill the window through a single capillary. It is therefore advantageous to provide a principal conduit which can be connected directly to the reservoir, bypassing the capillary, and provided with a value to be closed when the window is filled.

In order to facilitate the admission and outflow of the liquid circulating between the parallel plates of the window the filling conduit and the discharge conduit may advantageously be connected to canals at the top and bottom, the canals being provided by enlarging the space between the panes at the top and at the bottom, for instance by reducing the thickness of one or both panes at the top and at the bottom, parallel to the base of the window. The canals may also be made of material separate from but connected to the space between the panes, which avoids weakening the panes. In order that the liquid from the capillary tube supply the full length of the space between the panes equally through the upper canal it is advantageous to connect this tube to the filling conduit downstream of a valve which can be closed once the system is full, eliminating direct connection of the capillary tube to the canal.

The filling conduit may be connected to the upper canal by a fitting which constitutes a prolongation of the canal, but the fitting may also be disposed perpendicularly to the window, penetrating to the canal through one of its panes.

The transparent panes of the window may be assembled in conformity with prior practices but it is advantageous to assemble them by a silicone elastomer which seals the joints firmly and solidly, prevents escape of liquid from the system, and, surprisingly, is not attacked even after long use, by the photochromic solutions which circulate between the panes. This method of assembly, using silicone elastomers, is part of the invention and is equally useful with glass or plastic panes.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention.

In the drawing, wherein like reference characters refer to like parts throughout the several views, FIG. 1 is a schematic view of a window, for instance a windshield, assembly constructed according to the invention;

Figure 1:
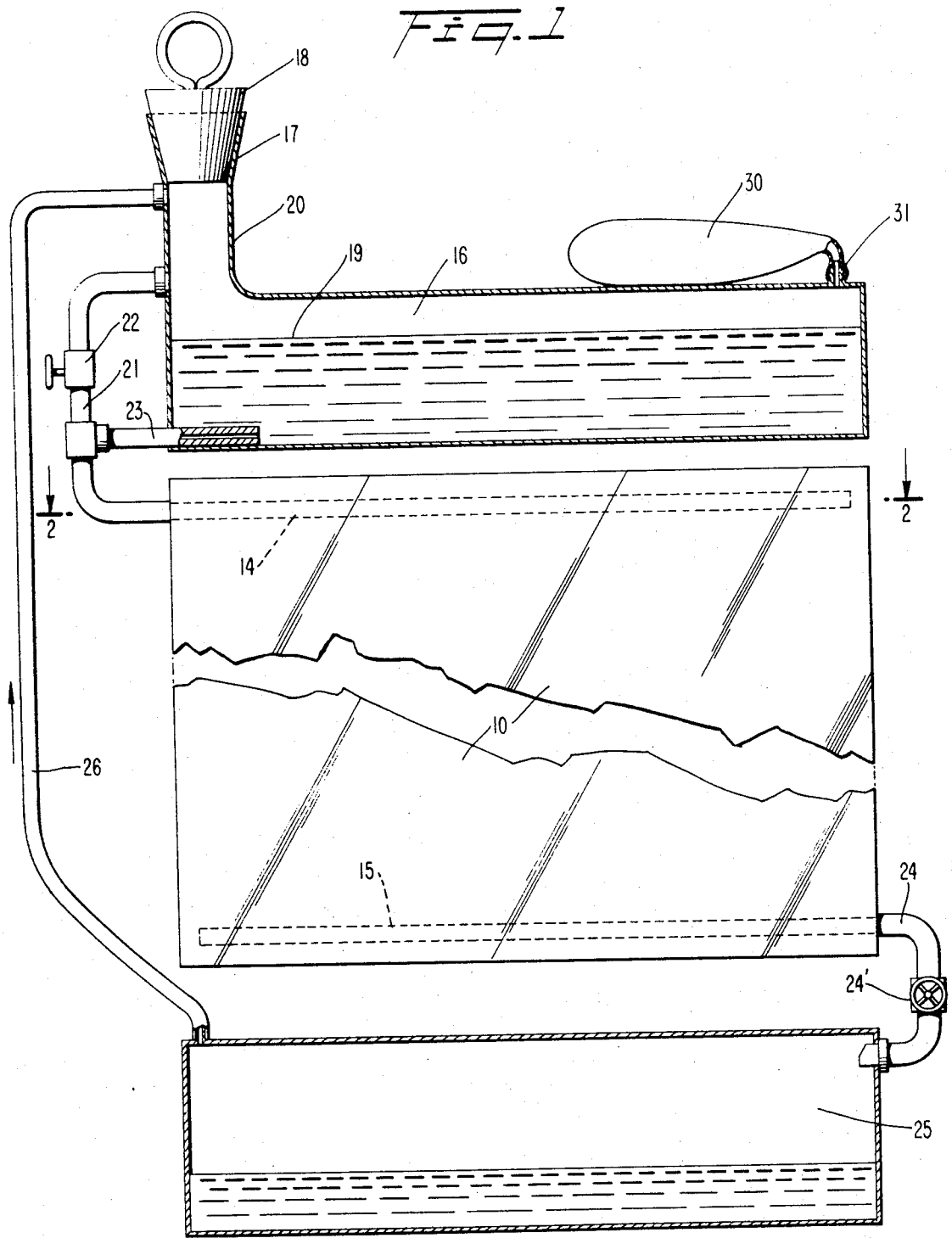

A window, for instance a windshield, 10 has front and back panes 11, 12 which are sealed at their edges as described in the French patent previously identified, to form a chamber between them. Fine filaments 13 maintain a gap of uniform size between the panes, for instance a gap of a few hundredths of a millimeter, for example 0.05 mm. It is through this gap that the photochromic liquid runs. The filaments are vertically arranged to avoid interference with the flow of the liquid. The space between the panes is enlarged at the top 14 and at the bottom 15 to form a channel to provide for the even distribution of the liquid throughout the length of the slot between the panes. Above the window is a reservoir 16 which has a filling funnel 17 which may be tightly closed by stopper 18 after the reservoir has been filled, for instance to a level 19. The funnel is mounted on the upper end of a neck 20 which is connected to the channel 14 by a conduit 21 in which is a valve 22. At the bottom of the reservoir 16 is a capillary tube 23 which opens into the reservoir at one end and into the conduit 21 at the other. It is located downstream of the valve 22.

The channel 15 is connected by a conduit 24 to the reservoir 25 below the window. A tube 26 connects the upper part of the reservoir 25 to the upper part of the neck 20 enabling gases from the lower reservoir to make their way into the upper reservoir. The conduit 24 may also be provided with a valve 24'.

When the apparatus is to be filled the stopper 18 is removed, the valve 22 is opened and the reservoir 16 is filled until it overflows into the conduit 21 and passes to the channel 14 and from thence through the narrow space between the panes to the channel 15, which is similar in construction to channel 14, and through the conduit 24 into the reservoir 25. The rate of flow can be controlled by the size of the conduit 24 or by adjustment of the valve 24'. When the liquid has filled the space between the panes the valve 22 is closed and the filling of reservoir 16 continues but not to a depth which would permit overflow through conduit 26. Thereafter, the stopper 18 is put in place and seals the system. A pressure-compensating balloon 30, collapsed, is attached to a tube 31 projecting from the top of the reservoir 16 and serves to compensate for any differences in pressure which may arise during operation.

The supply of liquid for the window is now derived from the capillary 23, which may have an interior diameter of from a few tenths of a millimeter to a millimeter, its actual size depending upon the rate of flow which is to supply the channel 14. The channel 14 may conveniently have a section of 3 × 3 mm. which also suffices for channel 15. Gravity flow through the conduit 24 to the lower reservoir 25 gradually draws the liquid down between the panes and the capillary 23 controls the rate of flow.

The viscosity of photochromic liquid is chosen as a function of its stability, that is to say the length of life of the photochromic compound, the liquid filling the internal space of the window being entirely replaced before the photochrome becomes degraded. In practice, the liquid should have a viscosity of several poises at room temperature. It is not the function of this invention to protect the compositions of matter which produce such viscosities but to reveal an apparatus which can be used to control the operation of the window automatically with all such compositions, a capillary tube being interchangeable with those of other internal capillary diameters when a sharp change in the viscosity of the photochromic liquid shall occur, for instance by replacement of one photochromic liquid by another.

Figure 2:
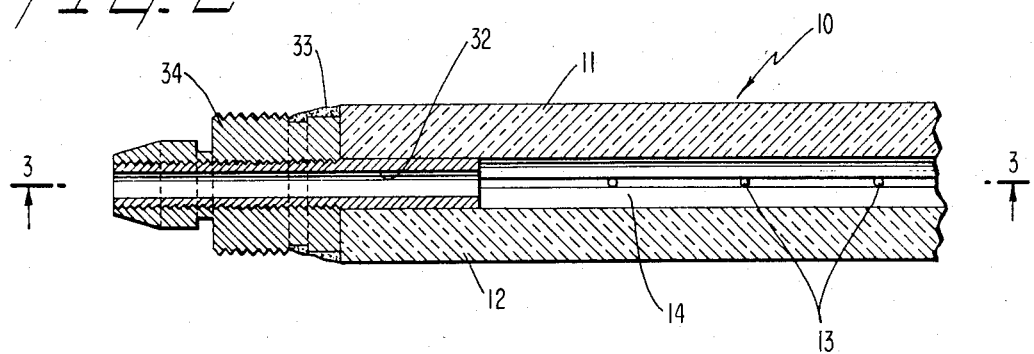
FIG. 2 is a cross section on line 2—2 of FIG. 1 illustrating details of the fitting which extends the channel between the panes.
Figure 3:
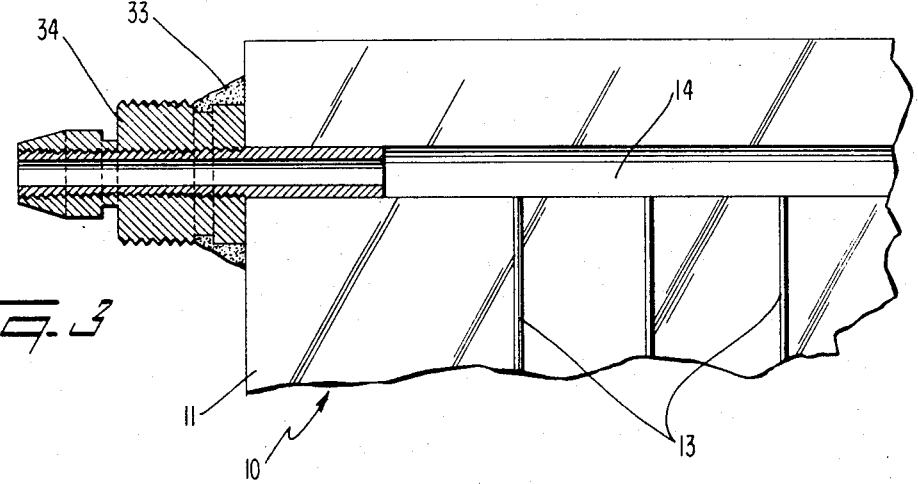
FIG. 3 is a section on line 3—3 of FIG. 2.

FIG. 1 does not show how the conduit 21 is connected to the channel 14 but this is illustrated in FIGS. 2 and 3. In FIG. 2 a tube 32 is set in the channel 14 and projects from the side of the window as a prolongation of that channel. A silicone elastomer 33 is placed about the tube 32 and tip 34 is screwed down upon it, making an impervious seal. The tip and the tube constitute a fitting which is connectable in a known manner to the conduit 21. The tube 32 carries the liquid which flows through the control capillary 23 to the channel 14. The edges of the two panes of the window may be connected as at 35 about their periphery by silicone elastomer or tin solder. The silicone elastomer is preferred and constitutes a part of the present invention as such elastomers are not attacked or altered by prolonged contact with the photochromic solutions. The conduit 26 balances the pressures in the upper and lower reservoirs and leaves the flow of liquid to gravity under control of the capillary.

Figure 4:
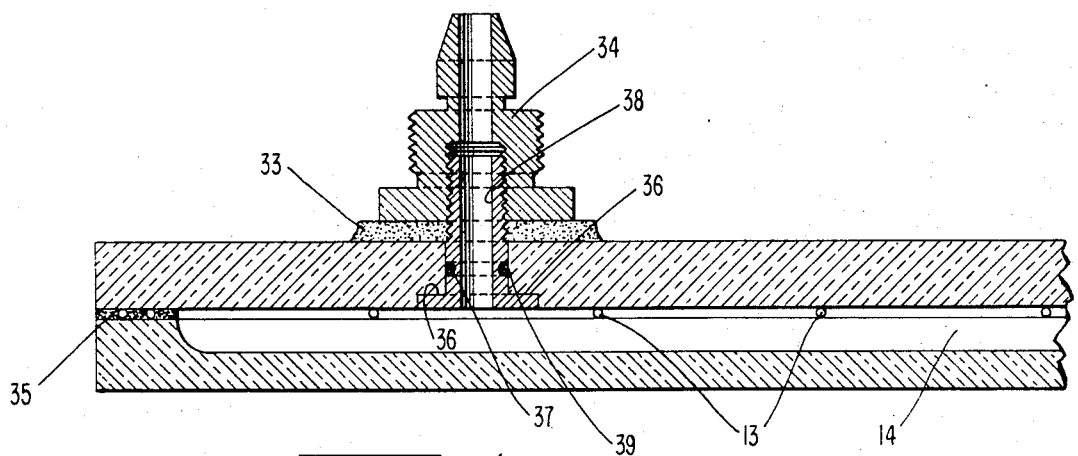
FIG. 4 is a section similar to that of FIG. 2 but illustrating a different location and mounting for the fitting.

In FIG. 4 is an alternate structure in which the channel 14 is formed in one of the panes only. In the interface of the pane is a countersunk seat 36 and a hole 37 which receive a footed tube 38 which projects from the outer face of the pane. The foot of the tube is within the countersink and may be mounted there by silicone elastomer, or a circular groove 39 encircling the tube may be filled with the elastomer and form a seal. A plaque of silicone elastomer 33 encircles the tube and the tip 34 is screw-threaded upon it, making a seal which prevents the escape of liquids or gases. The pressure within the apparatus would vary considerably under different conditions of exposure to light and heat and would, under some conditions, increase sufficiently to risk bending the thin glass panes and distorting vision, as well as resulting in the generation of bubbles in the lower part of the pane, but the provision of the expansible sack 30, which is of elastic material, prevents such inconveniences. The sack is implaced in collapsed condition at room temperature and expands when the gases of the reservoir expand for any reason preventing such imperfections.

Under ordinary circumstances the valve 24' can be omitted from the conduit 24. The capillary 23, the gravity flow between the panes, the friction of the panes, and the viscosity of the solution constitute a self-controlling system which requires no supervision during ordinary conditions of operation, such as would be encountered by an automobile windshield under extreme change of temperature.

As many apparently widely different embodiments of the present invention may be made without departing from the spirit and scope thereof, it is to be understood that the invention is not limited to the specific embodiments.

In the claims, the term "normally vertical" means the position of the panes as usually emplaced in a building or like structure, it being understood that the panes may under certain conditions of use, be inclined at a substantial angle to the vertical, without detracting from the utility of the invention.

What is claimed is:

1. A window assembly comprising first and second closely spaced panes, a source of liquid above the space between the panes, and means including a capillary flow passageway connecting the source of liquid with the top of the space between the panes and effective to maintain essentially constant the gravity flow of liquid to said space when the latter is filled with said liquid and the source and said passageway are at an essentially constant temperature, and a normally open outlet for free liquid flow from the bottom of said space, said passageway constituting the greatest resistance to liquid flow from said source through said space to said outlet, whereby said constant flow is independent of the temperature and viscosity of the liquid in said space.

2. The assembly of claim 1, said source of liquid comprising a first reservoir, a filling opening in said first reservoir, a second reservoir below the space between the panes, and a conduit in communication at its respective ends with said outlet and said second reservoir.

3. The assembly of claim 2, said panes being constructed and arranged to form a canal therebetween at and extending along the top edge of said space and from which the liquid may flow to said space, said capillary passageway being in communication with said canal.

4. The assembly of claim 3, said panes being spaced a distance on the order of 0.05 mm, said passageway having an effective diameter of not more than 1 mm.

5. A photochromic window having spaced panes of pellucid material, means to flow photochromic liquid into and through the space between the panes by gravity, and including a first reservoir and means to control the flow of liquid from said first reservoir into the space between the panes, comprising a passageway of capillary size in transverse section, said passageway constituting the greatest restriction to flow in the flow path and said reservoir and passageway being installed in a zone subject to only relatively small changes in temperature which do not appreciably affect the viscosity of the liquid and size of the passageway.

6. Apparatus comprising an on-edge window assembly including two spaced panes joined together at their peripheral margins to form a thin space therebetween, a sump reservoir below said space, conduit means connecting the bottom of said space to the top of said sump reservoir, a supply reservoir above said space, conduit means including a capillary flow passage connecting the bottom of the supply reservoir to the top of said space, said supply reservoir and flow passage being installed in a zone which is normally free from material temperature changes during use, said space, conduit means and reservoirs constituting a sealed system, and a liquid filling the space between the panes and at least partially filling the supply reservoir, whereby there is a constant flow of said liquid from the supply reservoir to the sump reservoir through the capillary flow passage and said space, the resistance to the flow of said liquid through said passage being substantially greater than that at any other part of the flow path.

7. Apparatus as defined in claim 6 comprising conduit means connecting the tops of said reservoirs above the liquid level therein whereby the gaseous pressure in said sealed system is equalized.

8. Apparatus as defined in claim 6 comprising conduit means by-passing said flow passage and connecting the supply reservoir to the top of said space.

9. Apparatus as defined in claim 8 comprising valve means for selectively opening and closing said last-named conduit means.

10. Apparatus as defined in claim 6 comprising a normally deflated flexible bag connected to the air space in the sealed system.

11. Apparatus as defined in claim 6 comprising transverse channels between the panes at the upper and lower ends of said space connecting the latter with said conduit means.

* * * * *